United States Patent [19]

Bogner

[11] Patent Number: 5,159,044
[45] Date of Patent: Oct. 27, 1992

[54] SHEET MOLDING COMPOUNDS HAVING IMPROVED VISCOSITY

[75] Inventor: Ben R. Bogner, Wheaton, Ill.

[73] Assignee: Amoco Corporation, Chicago, Ill.

[21] Appl. No.: 616,212

[22] Filed: Nov. 20, 1990

[51] Int. Cl.$^5$ .............................................. C08G 18/67
[52] U.S. Cl. ...................... 528/75; 528/44; 528/83; 528/85; 528/272; 525/17; 525/25; 525/27; 525/28; 525/36
[58] Field of Search ............. 525/17, 25, 27, 28, 525/36; 528/44, 75, 83, 85

[56] References Cited

U.S. PATENT DOCUMENTS 4,822,849  4/1989  Vanderlaan .......................... 525/47

Primary Examiner—John Kight, III
Assistant Examiner—Due Truong
Attorney, Agent, or Firm—Rae K. Stuhlmacher; William H. Magidson; Frank J. Sroka

[57] ABSTRACT

The invention relates to sheet molding compounds having improved viscosity control comprising polyester-polyurethane hybrid resins formed by the reaction of an A side composition and a B side composition. The A side composition comprises a polyfunctional isocyanate compound and a free radical polymerization catalyst. The B side composition comprises a mixture of (i) an ethylenically unsaturated monomer solution having no active hydrogen groups which has dissolved therein about 40-90 weight percent of a substantially water-free, unsaturated polyester polyol having at least one dicarboxylic alkene moiety and having an acid number less than five; and (ii) a methacrylate ester of a $C_2$-$C_{10}$ alkylene diol.

15 Claims, No Drawings

SHEET MOLDING COMPOUNDS HAVING IMPROVED VISCOSITY

This invention relates to improved sheet molding compounds. More particularly, the invention relates to sheet molding compounds comprising polyester-polyurethane hybrid resins which have been modified by the addition of methacrylate esters of $C_2$-$C_{10}$ alkylene diols to improve the viscosity of the sheet molding compounds.

BACKGROUND OF THE INVENTION

Polyester-polyurethane hybrid resins are well-known in the art of thermoset molding compositions. These resins are normally tougher than polyesters and stronger, stiffer and less expensive than polyurethanes. Such hybrid resins usually comprise a hydroxy-terminated unsaturated polyester polyol, an ethylenically unsaturated monomer such as styrene, a polyisocyanate, a free radical polymerization catalyst and often other additives. They can be easily adapted to many common thermoset molding techniques employed in polyurethane and unsaturated polyester industries. Such hybrid resins are commercially available from Amoco Chemical Company under the trademark Xycon hybrid resins and are supplied as two component systems having an A side and a B side. The A side contains the polyisocyanate and the free radical catalyst, while the B side contains the hydroxy-terminated unsaturated polyester polyol/styrene solution and optionally a polyurethane catalyst and/or filler.

It is known that sheet molding compounds (SMC) can be made from polyester or polyester-polyurethane hybrid resins. For example, a polyester or polyester-polyurethane resin paste which may contain a filler material such as calcium carbonate is first prepared and pumped into a sheet molding compound machine where it is applied to one or both of two carrier film sheets by metering blades and moved in two different directions. Optionally, the resin-coated sheets are moved past a station where metered amounts of reinforcing material such as chopped glass fibers are dropped onto the resin paste. Next, the sheets are typically joined together in a "sandwich" with the paste and glass-coated side of one or both of the two sheets as the center of the sandwich. The SMC is then moved through compression rollers to further impregnate the glass into the resin. This is called "wetting" of the glass fibers. The SMC is then removed from the SMC machine in rolls and transferred to a maturation room where the viscosity of the SMC is monitored. The initial viscosity of the SMC is low, i.e., about 15,000 to about 100,000 cps. As the SMC is matured or allowed to chemically react, the viscosity increases to much higher levels, i.e., about 30,000,000 to about 100,000,000 cps. The SMC is then taken to a molding station where it is unrolled, cut and separated from the carrier film. The SMC is placed in a mold, compressed under high pressure and cured.

One use of sheet molding compounds is to manufacture parts for automotive applications. However, in order to achieve the required strength for automotive parts, a reinforcing material such as chopped glass must be incorporated in the SMC as described above.

One problem associated with the manufacture of SMC with polyester-polyurethane hybrid resins is controlling the viscosity of the SMC paste at the initial stage so that the paste can be pumped into the SMC machine and a good wetting of the reinforcing fibers can be attained. Another problem is controlling viscosity at the maturation stage so that the viscosity of the SMC will increase but not to a level where it cannot be further processed into a molded part. Yet another problem is controlling the final properties of the molded part so that it will not be too brittle, will have a good surface appearance and will perform its intended function.

The general object of the present invention is to provide sheet molding compounds capable of improved viscosity control. It is another object to provide a method for making such sheet molding compounds. Other objects appear hereinafter.

These and other objects are achieved by improved sheet molding compounds which comprise polyester-polyurethane hybrid resins formed by the reaction of an A side composition and a B side composition. The A side composition comprises a polyfunctional isocyanate compound and a free radical polymerization catalyst. The B side composition comprises a mixture of (i) an ethylenically unsaturated monomer solution having no active hydrogen groups which has dissolved therein about 40-90 weight percent of a substantially water-free, unsaturated polyester polyol having at least one dicarboxylic alkene moiety and having an acid number less than five; and (ii) a methacrylate ester of a $C_2$-$C_{10}$ alkylene diol.

For the purpose of this invention, the term "cure" or "curing" means the transformation of the sheet molding compound from a liquid or flowable paste to a solid cross-linked material at the time of molding. This curing occurs by cross-linking of the reactive sites in the sheet molding compound hybrid resin system, including the reaction of the isocyanate with active hydrogen-containing compounds. Further, the curing of the sheet molding compound occurs via the vinyl addition reaction between the ethylenically unsaturated monomer containing no active hydrogen groups and the unsaturated polyester polyol. Depending on the catalyst employed, curing can optimally occur at temperatures of about 135° C. to about 160° C. for a time of between about 30 sec. and about 5 min. The term "polyfunctional" and the prefix "poly-", as used herein, are intended to include functionalities of two or greater.

SUMMARY OF THE INVENTION

The sheet molding compounds of this invention comprise polyester-polyurethane hybrid resins which are formed by the reaction of an A side composition and a B side composition. The A side composition comprises a polyfunctional isocyanate compound and a free radical polymerization catalyst. The B side composition comprises a mixture of (i) an ethylenically unsaturated monomer solution having no active hydrogen groups which has dissolved therein about 40-90 weight percent of a substantially water-free, unsaturated polyester polyol having at least one dicarboxylic alkene moiety and having an acid number less than five; and (ii) a methacrylate ester of a $C_2$-$C_{10}$ alkylene diol. The invention also comprises a method for making such SMC's capable of improved viscosity control. In a preferred embodiment of the invention, the SMC hybrid resins comprise about 5-30 weight percent isocyanate, about 30-60 weight percent polyester polyol in monomer solution and about 1-10 weight percent methacrylate ester. Further, in a most preferred embodiment, the SMC hybrid resins additionally comprise about 30-50 weight percent of a low profile additive.

The sheet molding compounds made according to the invention have many advantages. First, the addition of a methacrylate ester of a $C_2$–$C_{10}$ alkylene diol to an SMC hybrid resin paste formulation lowers the initial viscosity of the mixture. This permits easier pumping of the paste into an SMC machine and easier wetting of reinforcing fibers such as glass. Second, the methacrylate ester of a $C_2$–$C_{10}$ alkylene diol end caps a portion of the polyisocyanate so that infinitely long polymer chains are not formed making the SMC difficult or impossible to mold. Also, if the SMC is too viscous or near gelled, the SMC tends to retain air which produces blisters and has poor surface appearance. Third, the SMC's of the invention slow down urethane chain extension to provide SMC's with moldable viscosities, even after eight weeks of maturation. Therefore, the invention enables longer SMC storage prior to molding. Finally, the addition of a methacrylate ester of a $C_2$–$C_{10}$ alkylene diol produces a more reactive SMC by adding additional unsaturation cites for cross-linking of vinyl unsaturation of the polyol with the monomer which can shorten the cure cycles of the SMC molded products.

DETAILED DESCRIPTION OF THE INVENTION

The methacrylate esters of a $C_2$–$C_{10}$ alkylene diol which can be utilized in the instant invention include hydroxyalkyl methacrylates such as hydroxyethyl methacrylate, 3-hydroxypropyl methacrylate, 2-hydroxypropyl methacrylate, polypropylene glycol monomethacrylate and hydroxy-n-butyl methacrylate. The preferred methacrylate ester is hydroxyethyl methacrylate.

The ethylenically unsaturated monomers having no active hydrogen groups which are useful in the SMC hybrid resins of the invention can be any ethylenically unsaturated monomer capable of cross-linking the unsaturated polyester polyol via vinyl addition polymerization. Examples of useful ethylenically unsaturated monomers are styrene, o-, m-, p-methyl styrene, methyl acrylate, methyl methacrylate, t-butylstyrene, divinyl benzene, diallyl phthalate, diallyl isophthalate, triallyl cyanurate and mixtures thereof. The preferred monomer is styrene because it provides an economical monomer solution, is an excellent solvent for the unsaturated resin and enables low viscosity at low monomer levels.

The unsaturated polyester polyol has at least one dicarboxylic alkene moiety and is preferably an oligomer of an alpha, beta-ethylenically unsaturated dicarboxylic acid compound obtained by the condensation reaction of one or more of a saturated di- or polycarboxylic acid or anhydride and an unsaturated di- or polycarboxylic acid or anhydride with a glycol or a polyhydric alcohol. The unsaturated polyester polyol can also be prepared from unsaturated di- or polycarboxylic acid(s) or anhydride(s) with glycols and/or polyhydric alcohol(s). The polyols used in this invention have an acid number less than five, and preferably less than about two. Further, the polyols used in this invention have equivalent weights of between about 250 and about 1000, and preferably between about 250 and about 500. Examples of suitable saturated di- or polycarboxylic acids include isophthalic, orthophthalic, terephthalic, adipic, succinic, sebacic acid and mixtures thereof, with isophthalic acid being preferred. Typical unsaturated carboxylic acids or anhydrides include maleic acid, fumaric acid, citaconic acid, chloromaleic acid, allyl succinic acid, itaconic acid, mesaconic acid, their anhydrides and mixtures thereof, with maleic anhydride being the preferred choice. Examples of polyhydric alcohols which are useful in the invention include neopentyl glycol, ethylene glycol, diethylene glycol, triethylene glycol, propylene glycol, dipropylene glycol, 1,4-butanediol, polyethylene glycol, mannitol, 1,2-propanediol, 1,6-hexanediol, 1,3-butylene glycol and mixtures thereof, with neopentyl glycol, diethylene glycol, ethylene glycol and mixtures thereof being preferred.

The isocyanate compound, typically referred to as a polyisocyanate, must have at least two functional groups and be capable of reacting with the polyester polyol. Examples of suitable isocyanate compounds include 2,4-and 2,6-toluene diisocyanate (TDI), 4,4'-diphenylmethylene diisocyanate (MDI), polymethylene polyphenyl isocyanate (PMPPI), dianisidine diisocyanate, metaphenylene diisocyanate, isophrone diisocyanate, hexamethylene diisocyanate and mixtures thereof. The preferred isocyanates are liquified MDI's or PMPPI's. A most preferred isocyanate is Isonate 143L manufactured by Dow Chemical Company which is a polycarbodiimidemodified diphenylmethane diisocyanate having an isocyanate equivalent weight of about 143.6 g/equivalent of NCO, an NCO content by weight of 29.2 percent, a viscosity at 25° C. of 33 cps, a density at 25° C. of 1.214 g/ml and an NCO functionality of about 2.25. An optimal SMC hybrid resin according to the invention has an NCO:OH equivalent ratio of 1 or less.

The free radical polymerization catalysts useful in producing the SMC hybrid resins of this invention are vinyl polymerization catalysts such as peroxides, persulfides, perborates, percarbonates, and azo compounds or any other suitable catalyst capable of catalyzing the vinyl polymerization of the polyester polyol and/or the ethylenically unsaturated monomer. Illustrative of a few such catalysts are benzoyl peroxide (BPO), tertiary-butyl peroxybenzoate (TBPB), 2,2'-azo-bis-isobutyronitrile, dibenzoyl peroxide, lauryl peroxide, di-t-butyl peroxide, diisopropyl peroxide carbonate and t-butyl peroxy-2-ethylhexanoate. Promoters can also be used in combination with vinyl polymerization peroxide catalysts to control the rate of free radical initiation. The preferred free radical polymerization catalyst is TBPB at a concentration of between about 1 and 2 wt. %

In addition and preferably, the SMC hybrid resins of the invention comprise a low profile additive (LPA). These low profile additives are typically thermoplastic polymers such as vinyl acetate polymers and copolymers, acrylic polymers, polyurethane polymers, polyethylene, polymethyl methacrylate, polystyrene, butadiene styrene copolymers, saturated polyesters and polycaprolactone. These are typically non-reactive polymers (nonreactive end groups) of high molecular weights (10,000 to 200,000) which are supplied in a vinyl monomer such as styrene to reduce the viscosity of the thermoplastic to a workable range. The preferred LPA's used in this invention are polyvinyl acetate and polystyrene.

Optionally, a catalyst capable of catalyzing the polyurethane-forming reaction between the polyisocyanate and the polyhydroxyl compounds can be used in this invention. These catalysts include tertiary amines such as N,N-dimethylcyclohexylamine, tertiary phosphines such as trialkylphosphines, strong bases such as alkali and alkaline earth metal hydroxides, alkoxides, and phenoxides, acidic metal salts of strong acids such as ferric chloride and organotin compounds such as dibutyltin dilaurate. Other commonly used catalysts for making polyurethanes can be found in U.S. Pat. No. 4,280,979, incorporated herein by reference.

Optionally, fibers, fillers, catalysts, pigments, flame retardants, mold release agents, low profile additives, water scavengers, internal lubricants, and other processing aids, all of which are well known to those skilled in the art, can be added to the SMC's of the invention. Various organic or inorganic fibers or fillers can be added to improve the reinforcing properties of the SMC and/or reduce its cost. Such organic fibers include polyacrylonitrile fibers (PAN), pitch-based carbon fibers, aromatic polyamide fibers, liquid crystal polyester fibers or any polymeric fiber that improves the properties of the hybrid. Inorganic fibers include glass and whiskers, while inorganic fillers include such materials as aluminum trihydrate, calcium carbonate, clay, talc, mica, silica beads, calcium sulfate, ammonium polyphosphate, etc. While the amounts of filler, fiber or other additives will vary depending on the application, preferably, filler is used at levels of about 125 phr (parts per hundred resin) to about 250 phr. Further, about 20 wt. % to about 50 wt. % fibrous reinforcement can also be added to the SMC. For example, in one preferred embodiment, about 160 phr filler and 25 wt. % fiber are used to form a hybrid resin sheet molding compound according to the invention.

The method for making SMC according to the invention is as follows. A hybrid resin is first formed by reacting the liquid ingredients of the A side, which include the polyisocyanate and the free radical polymerization catalyst, with the B side liquid ingredients, which include the polyol, the ethylenically unsaturated monomer containing no active hydrogen groups, and at least one methacrylate ester of a $C_2$-$C_{10}$ alkylene diol. Next, any additional powder ingredients, such as an inert filler and a water scavenger, are added to form a liquid paste. The premixed resin paste is pumped into an SMC machine in which metered amounts of resin are spread onto one or both of two moving carrier films which can be a nylon or polyethylene film. Optionally, the resin-coated films are then moved past a station where metered amounts of fibers such as chopped glass are dropped onto the resin. The two carrier films are then joined together in a "sandwich" so that the resin pastes are in the center, and the carrier films are on the outside of the sandwich. The sandwich is then passed through rollers which compress the sandwich together impregnating any added fibers into the resin. Next, the sandwich is removed from the SMC machine to a maturation station where the resin is allowed to chemically react and thicken at ambient temperatures from an initial viscosity of between about 15,000 and about 100,000 cps to a viscosity of between about 3,000,000 and about 100,000,000 cps. When the SMC reaches a desired viscosity such as about 60,000,000 cps, it is removed from the maturation station to a molding station where it is cut into desired lengths or dimensions. The outer film is stripped off, and the SMC is placed in a mold and compressed under high pressures such as 1000 psi. The SMC is then cured at elevated temperatures such as between about 135° C. and 160° F. for about 30 seconds to about 5 minutes. Finally, the mold is opened and the molded product is removed.

While applicant does not wish to be bound by any theory, it is believed that when the A and B sides of the SMC hybrid resin are reacted, processed in the SMC machine, allowed to chemically react at the initial maturation stage and then molded, the hydroxyl and acid end groups of the polyester polyol react with the isocyanate groups, and the ethylenically unsaturated monomer having no active hydrogen groups copolymerizes with the unsaturated moieties in the polyester polyol to form a polyester-polyurethane. Crosslinking occurs through vinyl polymerization of the olefinically unsaturated moieties of the polyester polyol and the polymerizable ethylenically unsaturated monomer having no active hydrogen groups. With the addition of a methacrylate ester of a $C_2$-$C_{10}$ alkylene diol, which is believed to react with some of the isocyanate end groups to slow down the initial polymerization reaction of the polyester polyol and the polyisocyanate, the initial viscosity of the SMC is low enough so that it can be pumped into an SMC machine as a liquid paste. Further, the end-capping of the isocyanate by the methacrylate ester is believed to result in more linear polymer formation so that the viscosity of the SMC at the time of maturation is controlled, and the SMC can be stored for at least up to 8 weeks. When the SMC containing the hybrid resins of the invention is processed during molding, heat activation of the free radical polymerization catalyst results in three-dimensional polymer formation and curing of the final molded product.

PREPARATION OF POLYESTER POLYOLS

Unsaturated polyester polyols which were used to prepare the polyester-polyurethane hybrid resin sheet molding compounds of the invention were prepared as follows:

Unsaturated polyester polyols were prepared by charging the reactants in Table 1 into standard four-liter, four-neck reaction kettle equipped with a mechanical stirrer, thermometer, a partial condenser comprising a glass column packed with Berl saddles, a total condenser and receiver. This apparatus was mounted in an electric heating mantle with a temperature control device. For each run the entire reaction was carried out in an inert nitrogen atmosphere in which the nitrogen was passed through a rotameter and into the reaction medium near the mechanical stirrer. The reactants were heated slowly until the mixture could be agitated. The reactants were further heated until an overhead temperature of about 98°–100° C. was maintained. The reaction temperature at which water was liberated was about 150° C. Water was continuously removed from the reaction medium through the condenser system. The resin was heated to about 232° C. and held until the acid number was reduced to two or less, but more preferably, one or less.

Typical water content of the polyester polyols used in the invention is less than 1 percent, preferably less than 0.2 percent and most preferably less than 0.05 percent. The removal of water is important for two reasons. First, the removal of water is necessary to obtain the desirable molecular weight of the polyester polyol. Second, the water will react with the isocyanate in the SMC paste causing undesirable foaming.

Typical molecular weights of the polyester polyols (on a solid basis) useful in the instant invention are between about 500 and about 2000 g/mole, and preferably between about 500 and about 1000 g/mole. If the polyol is difunctional, the equivalent weight of the polyol is half the molecular weight, while polyfunctional polyols would have equivalent weights equal to the molecular weight divided by the OH functionality of the polyol.

Hydroquinone was then added to the polyols and the inhibited polyols were cooled to between 150° C. to 205° C. The polyols were then added to styrene monomer inhibited with 1,4-naphthoquinone and p-benzoquinone. The resulting polyols contained about 75 percent non-volatile material (NVM). Typical liquid properties of Polyols 1,2,3 and 4 are reported in Table 2.

TABLE 1

| Polyester Polyol Formulations | | | | |
|---|---|---|---|---|
| | Polyol 1 | Polyol 2 | Polyol 3 | Polyol 4 |
| Reactants | | | | |
| Isophthalic Acid, moles | 1.0 | 1.0 | 1.0 | — |
| Maleic Anhydride, moles | 1.0 | 2.0 | 2.0 | 3.0 |
| Diethylene Glycol, moles | 2.64 | 2.42 | — | — |
| Ethylene Glycol, moles | — | 1.50 | 1.96 | 1.96 |
| Neopentyl Glycol, moles | — | — | 1.96 | 1.96 |
| Di-n-butyl tin oxide, ppm | 250 | 250 | 250 | 250 |
| Inhibitors | | | | |
| Hydroquinone, ppm | 150 | 150 | 150 | 150 |
| 1,4-Naphthoquinone, ppm | 75 | 75 | 75 | 75 |
| p-benzoquinone, ppm | 100 | 100 | 100 | 100 |

TABLE 2

| Typical Liquid Resin Properties of Polyols | | | | |
|---|---|---|---|---|
| | Polyol 1 | Polyol 2 | Polyol 3 | Polyol 4 |
| Degree of unsaturation (mole/kg)* | 2.04 | 3.12 | 3.25 | 5.30 |
| Acid Number, solid basis- mg KOH/g | <2 | <2 | <2 | <2 |
| OH Number, solid basis- mg KOH/g. | 146 | 160 | 167 | 181 |
| Styrene Monomer, wt. % | 25 | 25 | 25 | 25 |
| Equiv. wt. as supplied- g/equivalent OH | 513 | 467 | 450 | 413 |

*The degree of unsaturation is calculated by dividing the weight of the polyester into the moles of maleic anhydride. The data is normalized to 100 g of polyol.

The invention described herein is illustrated, but not limited, by the following examples.

EXAMPLES

EXAMPLE 1

Hybrid Resins Prepared with Methacrylate Esters of C2-C10 Alkylene Diols

The liquid ingredients comprising the A side, i.e., polyisocyanate and t-butyl peroxybenzoate (TBPB), were added to the liquid ingredients comprising the B side of the hybrid resin, i.e., polyol containing 25% styrene, polystyrene in styrene diluent used as a low profile additive, hydroxyethyl methacrylate (HEMA), a low profile additive polyvinyl acetate sold under the trademark Neulon T by Union Carbide and a fatty acid mold release agent sold under the trademark Axel 1988 by Axel Products Company, and mixed at ambient temperature (about 20°-25° C.) in a Cowles high shear blender to a uniform mixture. The polyisocyanate is sold under the trademark Isonate 143L by Dow Chemical Company and is a polycarbodiimide-modified diphenylmethane diisocyanate having an isocyanate equivalent weight of about 143.6 g/equivalent of NCO, an NCO content by weight of 29.2 percent, a viscosity at 25° C. of 33 cps, a density at 25° C. of 1.214 g/ml and an NCO functionality of about 2.25. The powder ingredients, i.e., calcium carbonate filler and an alkali aluminosilicate water scavenger sold under the trademark Baylith L8 by Mobay Chemical Company, were then added to form a uniform slurry. The blending was carried out at a temperature of about 20°-25° C. for about 6-10 minutes. After mixing, the viscosity of the SMC paste was about 30,000 cps. The amount of each reactant is listed in Table 3.

TABLE 3

| Methacrylate Ester-Modified Hybrid Resin Formulation | | |
|---|---|---|
| Reactants | Mole % | Wt. % Hybrid Resin |
| A Side | | |
| Polyisocyanate | | 15.5 phr |
| t-Butyl Perbenzoate | | 1.5 |
| B Side | | |
| Polyol 3 (See Tables 1 and 2) | 0.8 | 41.7 |
| Hydroxyethyl Methacrylate | 0.2 | 2.8 |
| Polystyrene diluted in 60 wt % styrene | | 5.0 |
| Polyvinyl Acetate | | 35.0 phr |
| Fatty Acid Mold Release Agent | | 1.0 |
| Powder Ingredients | | |
| Calcium Carbonate | | 160.0 |
| Alkali Aluminosilicate Water Scavenger | | 1.0 |

EXAMPLE 2

SMC Prepared from Methacrylate Ester-Modified Hybrid Resins

The hybrid resin paste made in accordance with Example 1 was pumped into a 24-inch SMC machine where it was applied to two polyethylene carrier film sheets by metering blades and moved in two different directions. The hybrid resin-coated sheets were moved past a station where metered amounts of chopped glass of approximately one-half to one inch were dropped onto the resin paste at about 25 wt. % of the total hybrid resin paste. Next the sheets were joined together in a sandwich with the paste and glasscoated sides of the two sheets coming together as the center of the sandwich. The SMC was then moved through compression rollers to further impregnate the glass into the resin. The SMC sandwich was thereafter removed from the SMC machine in rolls of about 20 kg weight and transferred to a maturation room where the chemical reaction or "thickening" of the SMC was monitored. The SMC rolls were allowed to chemically react at a temperature of about 22° C. for one day to a paste viscosity of between about 30,000,000 and about 100,000,000 cps, and preferably about 60,000,000 cps. The SMC was then taken to a molding station where it was unrolled, cut to a 25 cm×25 cm size and separated from the polyethylene film. Next, the SMC was placed in a mold and compressed under a pressure of 1000 psi and cured at a temperature of 150° C. for two min.

EXAMPLE 3

Viscosity Decrease in SMC Made with Methacrylate Ester-Modified Resins

Sheet molding compounds made as described in Examples 1 and 2, with and without a methacrylate ester, were tested for initial viscosities (24 hours). Various polyvinyl acetates, Neulon A (Samples A and D), Neulon S (Samples B and E) and Neulon T (Samples C and F), all manufactured by Union Carbide, were tested to show that a variety of these compounds can be used in the instant invention. The results are reported in Table 4.

TABLE 4

| | NO HEMA | | | HEMA-MODIFIED | | |
|---|---|---|---|---|---|---|
| SMC | A | B | C | D | E | F |
| A SIDE (wt % Hybrid Resin) | | | | | | |
| Polyisocyanate | 13.7 | 13.7 | 13.7 | 15.5 | 15.5 | 15.5 |
| t-Butyl Perbenzoate (phr) | 1.5 | 1.5 | 1.5 | 1.5 | 1.5 | 1.5 |
| B SIDE (wt % Hybrid Resin) | | | | | | |
| Polyol 3 | 46.3 | 46.3 | 46.3 | 41.7 | 41.7 | 41.7 |
| HEMA | — | — | — | 2.8 | 2.8 | 2.8 |
| Styrene | 5.0 | 5.0 | 5.0 | 5.0 | 5.0 | 5.0 |
| PVA | 35.0 | 35.0 | 35.0 | 35.0 | 35.0 | 35.0 |
| Mold Release Agent (phr) | 3.0 | 3.0 | 3.0 | 3.0 | 3.0 | 3.0 |
| Powder Ingredients (phr) | | | | | | |
| Calcium Carbonate | 160 | 160 | 160 | 160 | 160 | 160 |
| Water Scavenger | 1.0 | 1.0 | 1.0 | 1.0 | 1.0 | 1.0 |
| Glass (wt % SMC) | 25 | 25 | 25 | 25 | 25 | 25 |
| Paste Viscosity (cps $\times$ 10$^6$) | | | | | | |
| Initial | .040 | .035 | .034 | .031 | .026 | .026 |
| 24 hrs. | 57.8 | 43.2 | 60.0 | 2.42 | 2.0 | 1.89 |
| Seven Days | gel | gel | gel | 54.2 | 33.6 | 44.4 |
| Properties of Molded SMC | | | | | | |
| Flexural Strength (psi) | 24,000 | 23,900 | 25,300 | 28,600 | 26,200 | 30,000 |
| Flexural Modulus (spi $\times$ 10$^6$) | 1.6 | 1.4 | 1.4 | 1.6 | 1.4 | 1.3 |

Table 4 indicates that the viscosity of SMC's made with methacrylate ester-modified resins have a substantially lower viscosity after approximately 1 day of maturation, and a viscosity at 7 days, which is comparable to or less than the viscosity of the SMC's made with unmodified resins at 1 day. The viscosities of the unmodified SMC's were not tested at 7 days because they had unprocessable viscosities at that point. Flexural strength and modulus were measured to determine properties of molded SMC which had been cured for 2 minutes at a temperature of 150° C. and a pressure of 1000 psi. These properties were tested after approximately 24 hours.

EXAMPLE 4

Dynamic Rheology Comparison

Dynamic rheology plots were made for (a) an SMC made according to the present invention (Sample F, Table 4), and (b) an SMC made with a nonmodified hybrid resin (Sample C, Table 4). Both samples were aged for two weeks at ambient temperatures and run at 80° C. using a Rheometrics mechanical rheometer in a parallel plate configuration. The SMC made from the non-modified hybrid resin had a dramatically higher viscosity of approximately two orders of magnitude, about $3.25 \times 10^8$ cps, compared to the SMC made according to this invention which had a viscosity of about $2.25 \times 10^6$ cps. This shows that SMC's made according to the invention are not advanced, even at two weeks, to unprocessable viscosities, whereas the viscosity level of the non-modified SMC makes molding impossible.

The sheet molding compounds made according to the invention have many advantages. First, the addition of a methacrylate ester of a $C_2$-$C_{10}$ alkylene diol to an SMC hybrid resin paste formulation lowers the initial viscosity of the mixture. This permits easier pumping of the paste into an SMC machine and easier wetting of reinforcing fibers such as glass. Second, the methacrylate ester of a $C_2$-$C_{10}$ alkylene diol end caps a portion of the polyisocyanate so that infinitely long polymer chains are not formed making the SMC difficult or impossible to mold. Also, if the SMC is too viscous or near gelled, the SMC tends to retain air which produces blisters and has poor surface appearance. Third, the SMC's of the invention slow down urethane chain extension to provide SMC's with moldable viscosities, even after eight weeks of maturation. Therefore, the invention enables longer SMC storage prior to molding. Finally, the addition of a methacrylate ester of a $C_2$-$C_{10}$ alkylene diol produces a more reactive SMC by adding additional unsaturation cites for cross-linking of vinyl unsaturation of the polyol with the monomer which can shorten the cure cycles of the SMC molded products.

That which is claimed is:

1. A sheet molding compound having improved viscosity comprising a polyester-polyurethane hybrid resin composition formed by the reaction of:
   (a) an A side composition comprising a polyfunctional isocyanate compound and a free radical polymerization catalyst; and
   (b) a B side composition comprising a mixture of (i) an ethylenically unsaturated monomer solution having no active hydrogen groups which has dissolved therein about 40-90 weight percent of a substantially water-free, unsaturated polyester polyol having at least one dicarboxylic alkene moiety and an acid number less than five; and (ii) a hydroxyalkyl methacrylate.

2. The sheet molding compound of claim 1, wherein the hydroxyalkyl methacrylate is at least one hydroxyalkyl methacrylate selected from the group consisting of hydroxyethyl methacrylate, 3-hydroxypropyl methacrylate, 2-hydroxypropyl methacrylate, polypropylene glycol monomethacrylate and hydroxy-n-butyl methacrylate.

3. The sheet molding compound of claim 2, wherein the hydroxyalkyl methacrylate comprises hydroxyethyl methacrylate.

4. The sheet molding compound of claim 1, wherein, when the A side composition is mixed with the B side composition, the polyester-polyurethane hybrid resin composition comprises about 5-30 weight percent isocyanate, about 30-60 weight percent polyester polyol in monomer solution and about 1-10 weight percent hydroxyalkyl methacrylate.

5. The sheet molding compound of claim 4, wherein the polyester-polyurethane hybrid resin composition further comprises about 30-50 weight percent of a low profile additive.

6. The sheet molding compound of claim 1, wherein the ethylenically unsaturated monomer solution having no active hydrogen groups comprises styrene, and the polyester polyol comprises a reaction product of at least one of a saturated polycarboxylic acid or anhydride and an unsaturated polycarboxylic acid or anhydride with a polyhydric alcohol or glycol.

7. The sheet molding compound of claim 6, wherein the saturated polycarboxylic acid or anhydride comprises isophthalic acid, the unsaturated polycarboxylic acid or anhydride comprises maleic anhydride, and the polyhydric alcohol or glycol is selected from the group consisting of diethylene glycol, ethylene glycol and neopentyl glycol and mixtures thereof.

8. The sheet molding compound of claim 1, wherein the ethylenically unsaturated monomer solution having no active hydrogen groups comprises styrene, and the polyester polyol comprises a reaction product of an unsaturated di- or polycarboxylic acid or anhydride with a polyhydric alcohol or glycol.

9. The sheet molding compound of claim 1 further comprising a fibrous reinforcement.

10. The sheet molding compound of claim 9 wherein the fibrous reinforcement is selected from the group consisting of polyacrylonitrile fibers, pitch-based carbon fibers, aromatic polyamide fibers, liquid crystal polyester fibers, glass fibers and whiskers.

11. The sheet molding compound of claim 1, wherein the B side further comprises a urethane catalyst.

12. The sheet molding compound of claim 1 further comprising an inert filler.

13. The sheet molding compound of claim 12 wherein the inert filler is selected from the group consisting of aluminum trihydrate, calcium carbonate, clay, talc, mica, silica beads, calcium sulfate and ammonium polyphosphate.

14. A process for making a polyester-polyurethane hybrid resin sheet molding compound having improved viscosity comprising reacting:
(a) an A side composition comprising a polyfunctional isocyanate and a free radical polymerization catalyst; and
(b) a B side composition comprising a mixture of: (i) An ethylenically unsaturated monomer solution having no active hydrogen groups which has dissolved therein about 40-90 weight percent of a substantially water-free, unsaturated polyester polyol having at least one dicarboxylic alkene moiety and having an acid number less than five; and (ii) A hydroxyalkyl methacrylate.

15. A molded article made by the process of claim 14.

* * * * *